United States Patent
Cseri et al.

(10) Patent No.: US 11,474,799 B2
(45) Date of Patent: Oct. 18, 2022

(54) PROVIDING CODE TRANSLATION RELATED TO RESILIENT DISTRIBUTED DATASETS IN DATABASE SYSTEMS

(71) Applicant: Snowflake Inc., Bozeman, MT (US)

(72) Inventors: Istvan Cseri, Seattle, WA (US); Isaac Kunen, Seattle, WA (US); Bing Li, Foster City, CA (US); Edward Ma, San Jose, CA (US); Srinath Shankar, Belmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 16/945,561

(22) Filed: Jul. 31, 2020

(65) Prior Publication Data

US 2022/0035611 A1 Feb. 3, 2022

(51) Int. Cl.
*G06F 8/51* (2018.01)
*G06F 16/2452* (2019.01)
*G06F 16/2455* (2019.01)
*G06F 16/242* (2019.01)
*G06F 16/901* (2019.01)
*G06F 16/27* (2019.01)

(52) U.S. Cl.
CPC ............ *G06F 8/51* (2013.01); *G06F 16/2448* (2019.01); *G06F 16/2452* (2019.01); *G06F 16/24554* (2019.01); *G06F 16/27* (2019.01); *G06F 16/9024* (2019.01)

(58) Field of Classification Search
CPC .... G06F 8/51; G06F 16/2448; G06F 16/2452; G06F 16/24554; G06F 16/27; G06F 16/9024

USPC ......................................................... 707/760
See application file for complete search history.

(56) References Cited

U.S. PATENT DOCUMENTS

| | | | | |
|---|---|---|---|---|
| 2007/0027905 | A1* | 2/2007 | Warren | G06F 8/51 |
| 2007/0286489 | A1* | 12/2007 | Amini | G06K 9/00664 382/195 |
| 2008/0089552 | A1* | 4/2008 | Nakamura | H04N 21/835 382/100 |
| 2008/0216060 | A1* | 9/2008 | Vargas | G06F 8/51 717/137 |
| 2008/0313161 | A1* | 12/2008 | Ramsey | G06F 16/2471 |

(Continued)

FOREIGN PATENT DOCUMENTS

EP 3889776 A1 * 10/2021 .......... G06F 9/5066

OTHER PUBLICATIONS

"International Application Serial No. PCT/US2021/070800, International Search Report dated Aug. 6, 2021", 2 pgs.

(Continued)

*Primary Examiner* — Pierre M Vital
*Assistant Examiner* — Andrew N Ho
(74) *Attorney, Agent, or Firm* — Schwegman Lundberg & Woessner, P.A.

(57) ABSTRACT

The subject technology receives first code in a first programming language, the first code including a reference to a first dataset. The subject technology converting the first code to: second code in a second programming language different than the first programming language, and at least one data query in a second format different than the first programming language. Further the subject technology sends the converted first code and the at least one data query to a data system for execution.

21 Claims, 8 Drawing Sheets

(56) References Cited

U.S. PATENT DOCUMENTS

| | | | | |
|---|---|---|---|---|
| 2012/0151437 | A1* | 6/2012 | Kneisel | G06F 8/31 |
| | | | | 717/114 |
| 2013/0166711 | A1* | 6/2013 | Wang | G08B 13/19643 |
| | | | | 709/223 |
| 2014/0325491 | A1* | 10/2014 | Dhoolia | G06F 8/51 |
| | | | | 717/137 |
| 2017/0337138 | A1* | 11/2017 | Li | G06F 12/0246 |
| 2018/0004751 | A1* | 1/2018 | Vikhe | G06F 16/24578 |
| 2018/0067869 | A1* | 3/2018 | Yang | G06F 3/0685 |
| 2018/0075107 | A1* | 3/2018 | Park | G06F 16/24568 |
| 2018/0101583 | A1* | 4/2018 | Li | G06F 16/254 |
| 2018/0203912 | A1* | 7/2018 | Cao | G06F 16/2471 |
| 2018/0275977 | A1* | 9/2018 | Kudriavtsev | G06F 8/51 |
| 2018/0321916 | A1* | 11/2018 | Inoue | G06F 8/30 |
| 2020/0125238 | A1* | 4/2020 | Vadapandeshwara | |
| | | | | G06F 9/465 |

OTHER PUBLICATIONS

"International Application Serial No. PCT/US2021/070800, Written Opinion dated Aug. 6, 2021", 21 pgs.

* cited by examiner

PROVIDING CODE TRANSLATION RELATED TO RESILIENT DISTRIBUTED DATASETS IN DATABASE SYSTEMS

TECHNICAL FIELD

Embodiments of the disclosure relate generally to a network-based database system or a cloud data platform and, more specifically, to facilitating access and use of distributed datasets from a separate system.

BACKGROUND

Data-driven companies often find themselves producing and consuming large quantities of data, moving to and from a plethora of different sources, data formats, staging areas, storage systems, distributed file systems, and the like. While existing cloud-based data warehouse and other database systems or data platforms sometimes provide effective means for relational (and semi-structured) analytics, the bigger reality is that other data-processing frameworks based on imperative languages remain popular due to their expressiveness.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Clients (e.g., users) of a network-based database system (e.g., as described further herein) may utilize Apache Spark™, or another third party API or platform, for analytics, as Apache Spark™ includes a rich ecosystem of compatible connectors and machine-learning libraries, as well as a programmable interface that allows users to easily write Scala, Python, R, and Java user defined functions (UDFs). However, in many instances, users or businesses still need to run/manage/pay-for an Apache Spark™ cluster external to their existing database systems, thereby increasing costs and/or complexity of deploying such systems that require access to Apache Spark™. This complexity is exacerbated by incompatibilities in code that executes in Apache Spark™ and code that is compatible for execution in a database system. Further, data formats utilized by Apache Spark-™ (e.g., data structures supporting distributed datasets) are not easily interoperable with database tables and tabular data utilized in a database system.

Aspects of the present disclosure address the above and other deficiencies of providing access to external systems that provide data analytics and other features related to distributed datasets. More specifically, embodiments described herein advantageously (at least) implement translations of distributed datasets to equivalent SQL query statements that can execute on database table(s) in the subject cloud database system.

Figure 1:
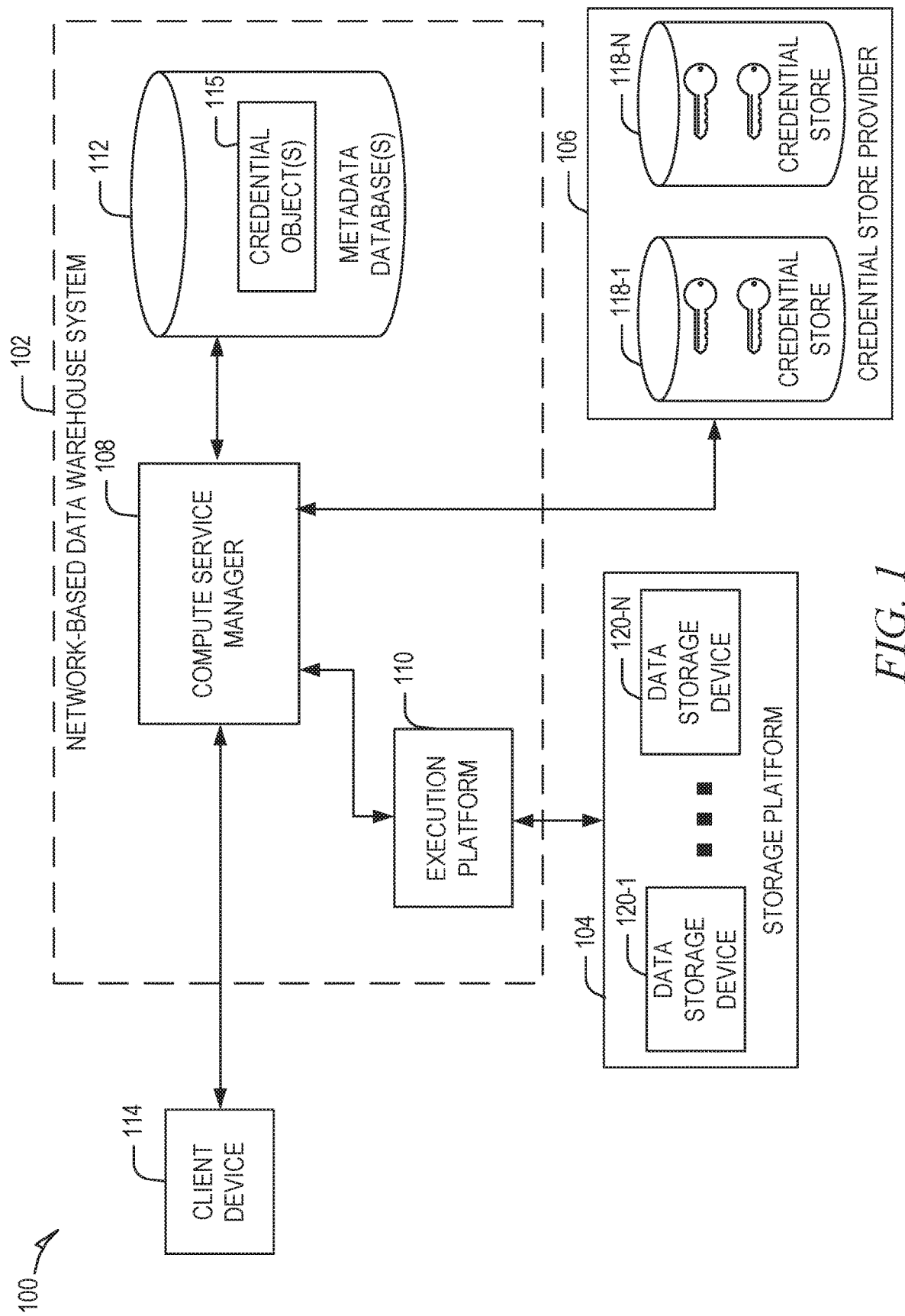
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage™), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the cloud credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the cloud storage platform 104).

The compute service manager 108 is further coupled to the execution platform 110, which provides multiple computing resources that execute various data storage and data retrieval tasks. The execution platform 110 is coupled to cloud storage platform 104 of the cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and cloud storage platform 104, are shown in FIG. 1 as individual discrete components. However, each of the compute service manager 108, metadata database(s) 112, execution platform 110, and cloud storage platform 104 may be implemented as a distributed system (e.g., distributed across multiple systems/platforms at multiple geographic locations). Additionally, each of the compute service manager 108, metadata database(s) 112, execution platform 110, and cloud storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
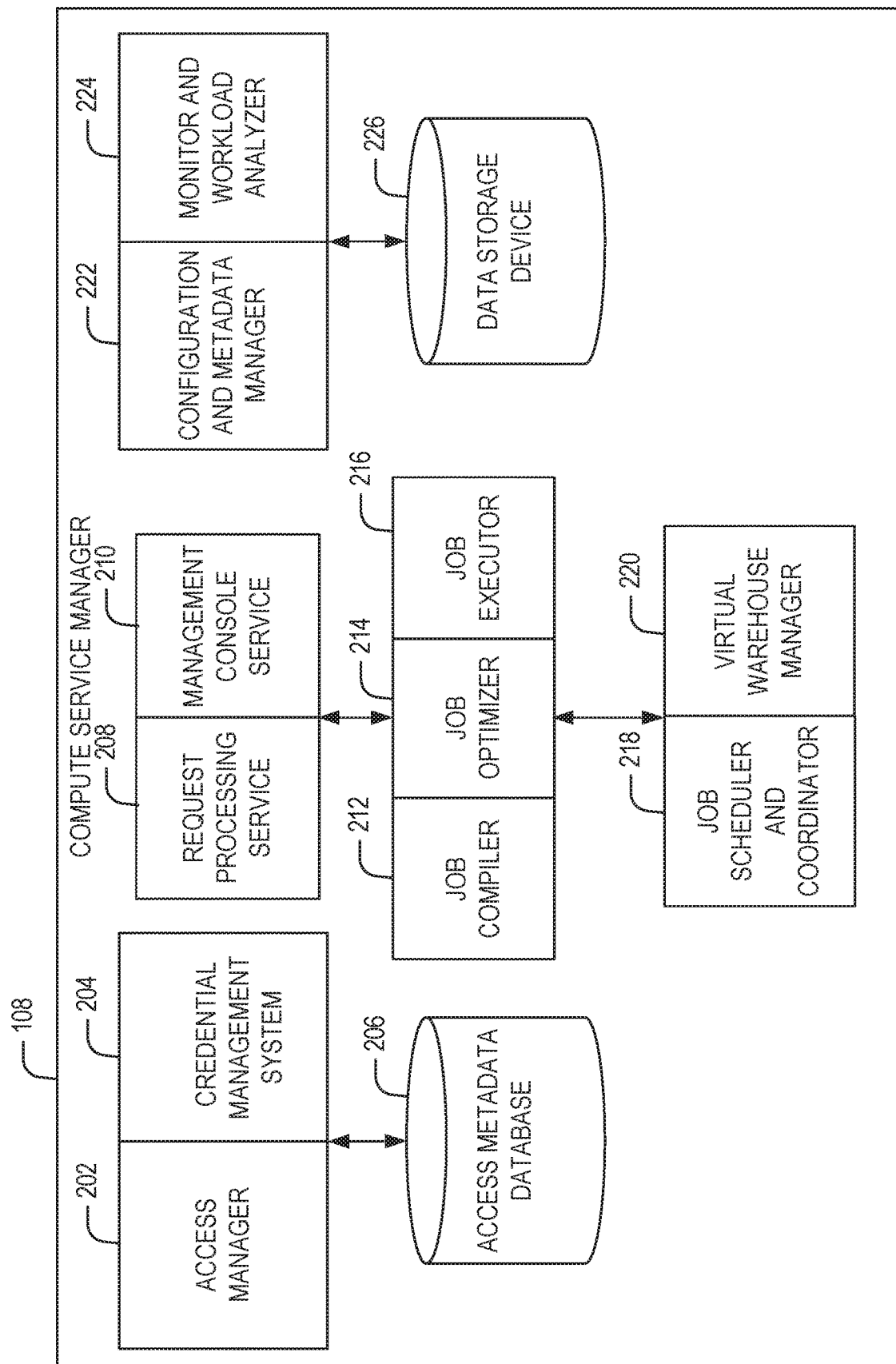
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in cloud storage platform 104, or any other storage device.

Figure 3:
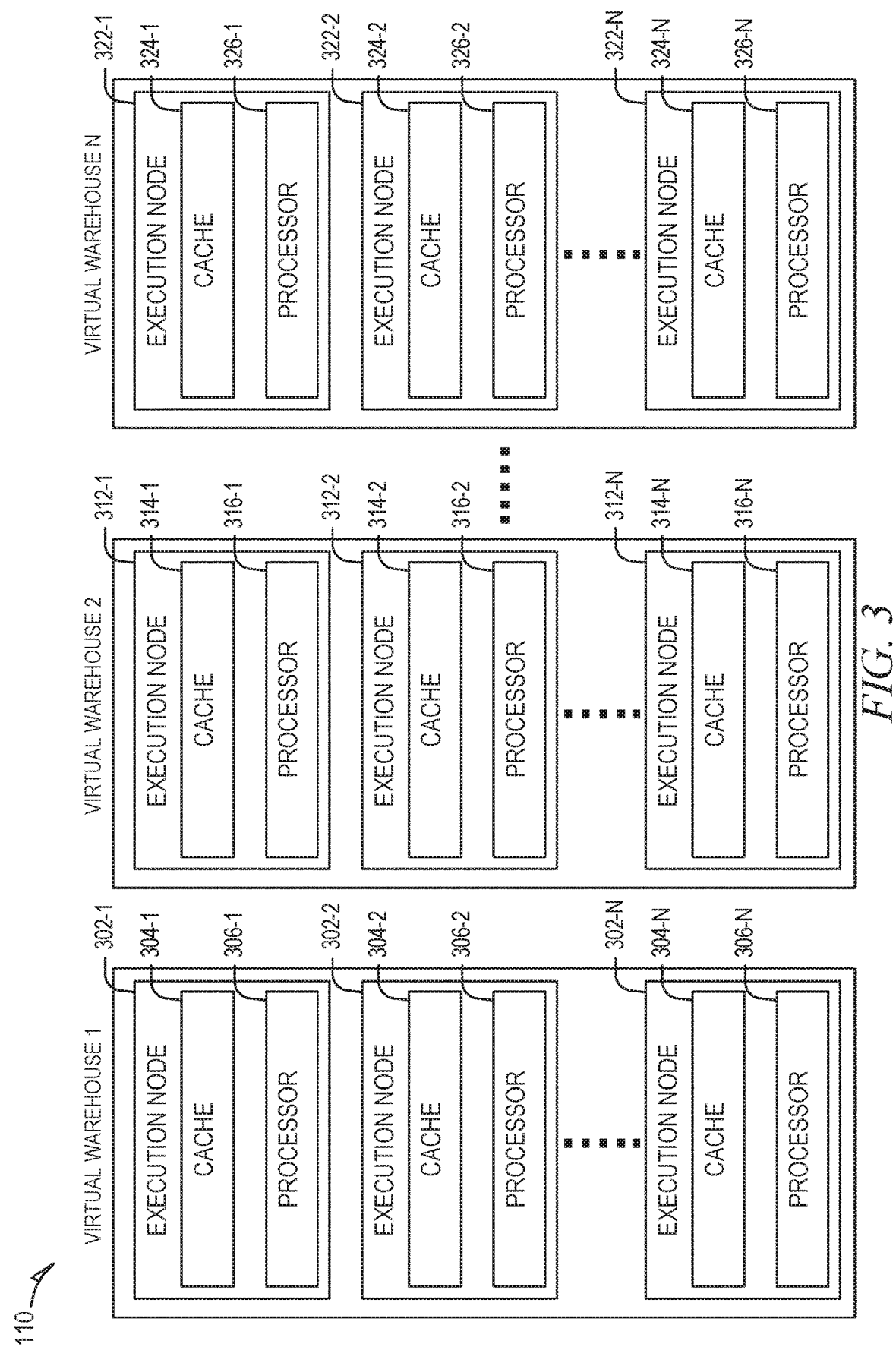
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
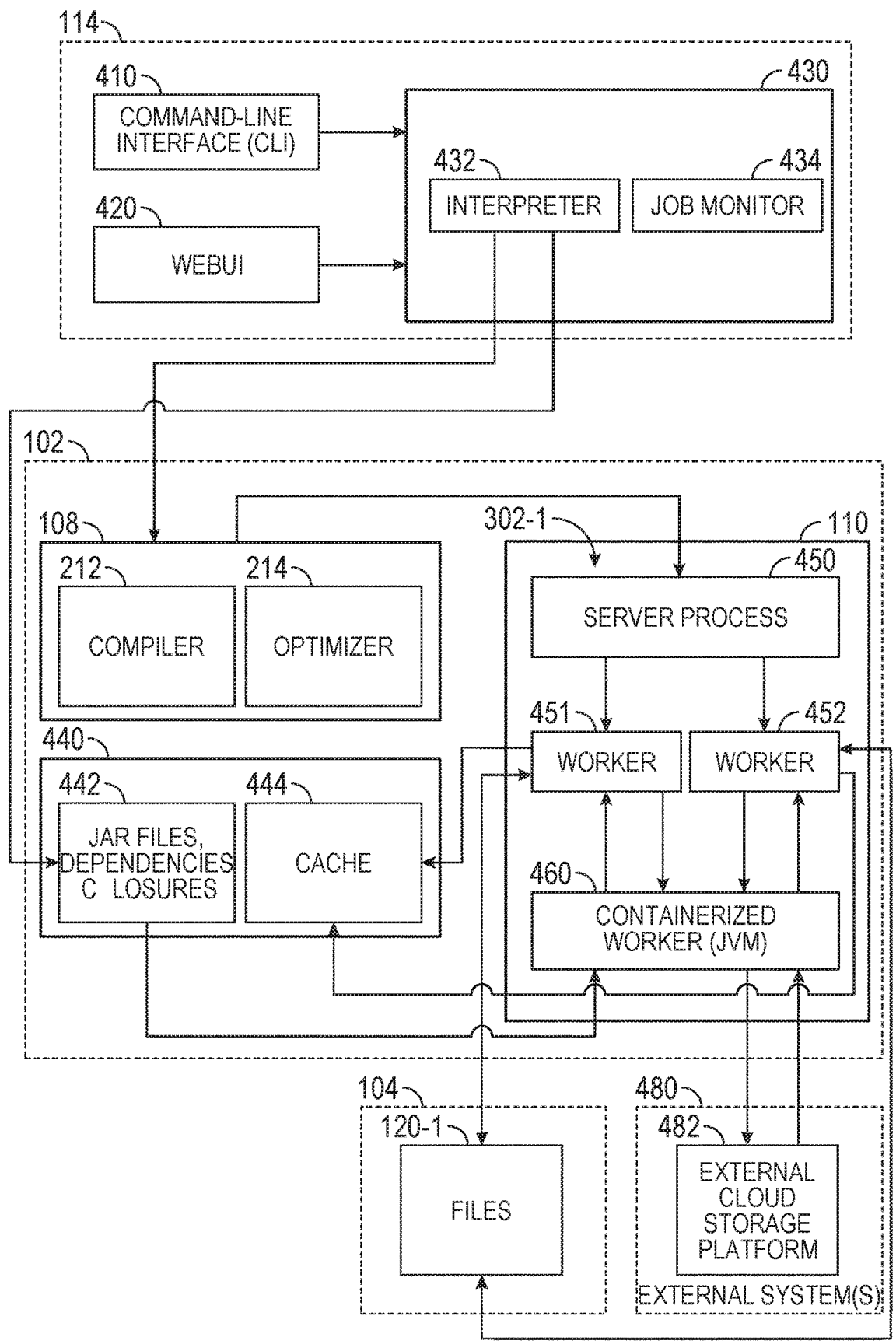
FIG. 4 is a computing environment conceptually illustrating an example software architecture for translating code in a given format to a database query and for running such translated code on a given execution node of the execution platform, in accordance with some embodiments of the present disclosure.

FIG. 4 is a computing environment conceptually illustrating an example software architecture for translating code in a given format (e.g., particular programming language, and the like) to a database query and for running such translated code on a given execution node (e.g., the execution node 302-1) of the execution platform 110, in accordance with some embodiments of the present disclosure.

In the example shown in FIG. 4, the client device 114 includes a command line interface (CLI) 410, and web user interface ("WebUI") 420 as development tools for executing code or code statements in a given programming language(s). Such code statements are included in a computer program(s) that is created, in part, by a developer (e.g., the user) using the tools provided by the client device 114. Further, the client device 114 includes a driver 430, which can be utilized to execute such code statements as discussed below.

In an example, the CLI 410 is a text-based UI used to process commands for a computer program in the form of lines of text, which can send code statement(s) in a given programming language to the driver 430. The CLI 410, for example, can be used to receive commands (e.g., via user text input) and provide such commands to an interpreter or a compiler for processing high level code statements in the programming language. In comparison, the WebUI 420 provides a graphical interface (e.g., interface displayed in a browser application) for processing commands and activities related to development of a computer program.

The client device 114 also includes a driver 430. The driver 430 includes an interpreter 432 and a job monitor 434. The driver 430 may be implemented as a JAR file in an embodiment thereby enabling the user to execute the driver 430 in a client environment (e.g., in a JVM environment provided by the client device 114, other development environment, and the like).

In an embodiment, the interpreter 432 translates (e.g., converts) each code statement of a program in a given programming language to machine code, during execution, forgoing a process to compile the code statements of the program to machine code (e.g., compiled code) prior to execution. In an example, programming languages that utilize an interpreter, instead of a compiler, include JavaScript, PHP, Python, Ruby, Scala, and the like. The interpreter 432 translates, in an embodiment, a code statement(s) in a first programming language to code in a second programming language (e.g., part of the user defined function such as a Java UDF discussed below) and at least one SQL statement corresponding to a database query (e.g., including a SQL command(s) (e.g., SELECT, UPDATE, DELETE, etc.), which can be executed by an execution node on a database of the subject system. Thus, even when the code in the first programming language is incompatible for execution, the translated code in the second programming language is compatible with the network-based data warehouse system 102 and can be executed by components thereof for performing a database query on a database table(s) of the subject system (e.g., based on the translated SQL query).

The interpreter 432 can serialize the translated code in the second programming language to send to a stage of the network-based data warehouse system 102 for storage as discussed further below. In an example, the interpreter 432 generates a user defined function in the compatible second programming language based at least in part on a translation of the code in the first programming language, which can be included in the serialized code. The interpreter 432 sends translated SQL queries to the compute service manager 108 of the network-based data warehouse system 102 for further processing as discussed below.

However, it is appreciated that in some embodiments, the code translation aspects of the interpreter 432 can support code translation to another programming language (e.g., Python) and may not include a translation to a SQL query. Moreover, the subject system can utilize stored procedures (e.g., written in other programming languages) to execute equivalent operations on a database table provided by the subject system.

In examples described herein, the first programming language is Scala. In other systems, Scala can be used in conjunction with an Apache Spark™ deployment for data analytics and is a separate external system from the network-based data warehouse system 102, and the second programming language is Java (or Python). However, it is appreciated that as described further herein, embodiments do not utilize the aforementioned Apache Spark™ deployment and are enabled to execute at least Scala code or Java code within the subject system itself.

In an embodiment, the interpreter 432 can be implemented similar to a "source-to-source compiler" which refers to a type of translator that takes the source code of a program written in a programming language as its input and produces an equivalent source code in a different programming language. Code in the first programming language can therefore be translated such that components of the network-based data warehouse system 102 can execute the translated code without needing or utilizing the external system (e.g., the Spark system), and in a manner that is transparent to the user (e.g., the one writing or providing the code in the initial programming language).

In an embodiment, the interpreter 432 accesses a language-integrated API for constructing user-defined functions and SQL queries for executing on the network-based data warehouse system 102. Such an API, in an embodiment, can support and interoperate with programming languages including Java, Scala, and Python, including translating code as discussed above into a compatible SQL statement(s) and compatible code supported by components of the network-based data warehouse system 102. Further, the API supports a user defined function(s) that are called in conjunction with executing a SQL query as discussed herein.

The interpreter 432 is configured to process at least a portion of code in the first programming language, including for example supporting aspects of a given API associated with the first programming language (e.g., Scala API(s)) to enable translating code statements in the first programming language to code statements in a second programming language and respective SQL statements (which can then be executed by other components of the network-based data warehouse system 102). In an embodiment, driver 430 and/or the interpreter 432 is configured to handle and process RDDs (resilient distributed datasets), which are supported and/or utilized by the first programming language. Further, driver 430 and/or the interpreter 432 supports the processing and utilization of dataframes, which is discussed further below after the following discussion with respect to RDDs.

A "RDD" refers to a resilient distributed dataset, which includes an immutable distributed collection of objects. In an example, a given RDD can be understood as a logical representation of a dataset which is partitioned across different nodes of a given cluster of machines (e.g., servers). Partition information is then shared at least among each node in the cluster. Thus, a given RDD can include (or a reference to) raw data and information related to how the data is partitioned. The code in the first programming language provided to the interpreter 432 can include a reference to one or more RDDs, which the interpreter 432 can process (e.g., convert into compatible code and SQL statement(s)) in order to make the RDDs compatible with components of the network-based data warehouse system 102.

In an example, operations that are performed on the RDD can include two types: 1) transformations and 2) actions. A "transformation" applies a function on an RDD and creates a new RDD. An "action" is used to either save results to a location or to display the results. When any action is called on the RDD, a DAG (directed acyclic graph) can be created, which is discussed further below. Moreover, in an example, the interpreter 432 may not translate code statements in the first programming language until at least one action is detected in the code (e.g., requiring results to be displayed or provided). In an embodiment, a given RDD represents a transformation. In this example, a tree of RDD operations is constructed, and then an action triggers evaluation of this RDD tree (or a derived RDD tree). E.g., an RDD A represents the data in a table. A second RDD B may refer to RDD A and filter out a collection of rows. An action may evaluate the tree rooted at B (and that includes A). An action may also derive a new tree that adds an RDD C to the tree that would only retrieve the first 10 records, and then evaluate this.

In an example, code in a first programming language (e.g., Scala code) can be provided to perform operations (e.g., various transformations or actions) involving a given RDD. As mentioned before, transformations are operations on an RDD that create one or many new RDDs, and there are two transformations that can be applied onto the RDDs: 1) narrow transformation and 2) wide transformation. Wide transformations result in stage boundaries and require the data to be shuffled (e.g., partitioned or moved across partitions), and narrow transformations do not require data to be shuffled across the partitions.

In an example, a Spark system can leverage RDDs to execute distributed compute functionality. RDDs are partitioned using a given partitioning scheme (e.g., hash, range and extensible custom schemes, and the like). The partitions are sharded across the compute nodes of the cluster and their location is tracked by the system. The operations are parallelized by creating compute tasks which operate on individual partitions executed on the compute nodes. The model is pull-based in an example. The RDDs form a directed acyclic graph (DAG) where each RDD may depend on one or more RDDs as inputs to iterate over and produce an iterator to be consumed by other RDD(s). Such a DAG includes vertices that represent the RDDs and edges that represent a particular operation to be applied on an RDD (e.g., from which the edge is directed away from).

In a given Spark system, the execution is pipelined in the nodes when the RDDs use the same partitioning scheme but when an operation requires access to data between non-aligned partitions a reshuffle operation is required (e.g., moving data across partitions). During reshuffle, the producing RDD is usually a map and each partition creates files on the node according to the destination partitioning scheme. The consuming RDD is a ShuffleRDD (e.g., shuffle RDD) which will create the partitions by reading the appropriate files produced by the previous operation. This mechanism is called a shuffle stage in a Spark system because the production has to be completed before the consuming RDD can start reading.

For executing such RDDs that are compatible with Spark in the subject system, the driver 430 (or interpreter 432) maps the standard operations on RDDs to relational operations on tables. In an implementation, this can be accomplished by the driver 430 (or component thereof such as the interpreter 432) determining the DAG of RDDs and producing a SQL query with equivalent functionality (e.g., the aforementioned code translation functionality by the driver 430 discussed before) as discussed further below. Although the examples described herein relate to the driver 430 performing the code translation to equivalent SQL query, in some embodiments, the driver 430 can send a RDD to another component of the network-based data warehouse system 102 (e.g., the job compiler 212) to perform the aforementioned code translation to SQL query aspects.

The user can provide code written in the first programming language (e.g., Spark code written in the Scala programming language that is compatible with a Spark system), and the translation to a second format corresponding to a second programming language is performed transparently by the driver 430 and/or interpreter 432 without additional user interaction or required changes to the code. The second format is a programming language such as Java, which is compatible with the network-based data warehouse system 102, and also includes SQL statements that are translated based on the expressions from the code in the first programming language.

In an embodiment, the user can provide code, including various code statements (e.g., functional expressions), in the first programming language, which when executed, generates an RDD that contains a set of data and partitions of the data. The following code includes such an example (with an RDD which contains values 1 to 10 in 5 partitions and map the values to be 10 times each):

val rddPar=sparkContext.parallelize(1 to 10, 5)
val rddMap1=rddPar.map(v=>v*10)
val result1=rddMap1.glom( ).collect( )

In the above example, the "sparkContext.parallelize" is code (e.g., API call) that invokes operations to generate a first RDD (e.g., a first JVM object) which is a parallel collection of a number of partitions (e.g., 5) and can be created in a JVM. The "rddPar.map" is code that invokes operations to map (e.g., partition) the data in accordance with specified parameters, which returns a second RDD (e.g., a second JVM object) which has a reference to the previous RDD (e.g., "rddPar") from which the second RDD was derived. By continuing in this manner, a given RDD can be generated to an arbitrary depth.

In an embodiment, a set of particular code expressions will initiate execution of an operation (e.g., an action that indicates to provide an output of data to the driver 430). In the above example, the "rddMap1.glom( ).collect( )" expression initiates execution of an operation to run the second RDD ("rddMap1") and provide results to the driver 430. In another example, a code expression to call a "show" command can also initiate execution of an operation (e.g., an action) to display or output results (e.g., showing results).

In an example, printing out the RDD DAG and the number of partitions with the content of those shows the MapPartitionsRDD depending on the ParallelCollectionRDD and the resulting 5 partitions, which is illustrated in the following:

(5) MapPartitionsRDD[1] at map at Test.scala:162 [ ]
| ParallelCollectionRDD[0] at parallelize at Test.scala:161 [
]
   number of partitions: 5
   [10,20]
   [30,40]
   [50,60]
   [70,80]
   [90,100]

In order for the driver 430 to be fully compatible with the first programming language (e.g., Scala) and similar to how the aforementioned code would execute on a given Spark system, a "right" number of partitions is determined, where the iterator per partition is executed to produce the resulting values from the resulting iterator. In this manner, custom RDDs can be executed where the system may not know the semantics of the operation. In an implementation, the partition array is determined from the root RDD and a table is generated which contains the partition information and also the RDD information. In example, such a table may include the following information:

| PARTITION_NUMBER | PARTITION_OBJECT | RDD_OBJECT |
|---|---|---|
| 0 | 0000003daced0005 . . . | 0000003daced000573 . . . |

In the above example partition table, a partition number is the partition ID, a partition object contains the serialized partition object for that partition, and an RDD object contains the serialized RDD DAG.

In order to have sufficient degree of parallelism (DOP), the subject system can base it on the number of partitions or a micro-partition can be created per Spark partition.

In an example, a Scala table valued function is executed which establishes the Spark context, deserializes the partition and RDD objects and invokes the iterator on the RDD and returns a row per resulting items from the iterator. A materialized view of rows can be provided as the result.

An example of the generated function (e.g., UDF) is the following:

```
def mapRow: Row => Seq[Row] = row=>{
   row.getBytes(1)
      val p = Utils.deserialize[Partition](bytes)
      val rddValue = row.getString(2)
      val rddBytes = Hex.decodeHex(rddValue.toCharArray)
```

```
      val rdd = Utils.deserialize[RDD[T]](rddBytes)
      val context = TaskContext.create(p.index) rdd.iterator(p, context).map(r =>
         new DriverRow(Seq(DriverRowField("PARTITION_NUMBER", VarcharType( ), p.index.toString),
   DriverRowField("PARTITION_RECORD", VarcharType( ), r.toString)))
      ).toSeq
}
```

A result of the above is created by the following translated code to SQL query:

```
CREATE OR REPLACE TABLE
TS_RESULT_DEFAULT_APP_NAME_0 AS
(
   SELECT
      TS_PARTITION_NUMBER AS PARTITION_NUMBER,
      TS_PARTITION_RECORD AS PARTITION_RECORD
      FROM spark_example_partitions,
   LATERAL
   TS_RESULT_DEFAULT_APP_NAME_0_FUNCTION
   (
      PARTITION_NUMBER,
      PARTITION_OBJECT,
      RDD_OBJECT
   )
)
```

The following is an example of a table in the subject database system:

| PARTITION_NUMBER | PARTITION_RECORD |
|---|---|
| 0 | 10 |
| 0 | 20 |
| 1 | 30 |
| 1 | 40 |
| 2 | 50 |
| 2 | 60 |
| 3 | 70 |
| 3 | 80 |
| 4 | 90 |
| 4 | 100 |

In an embodiment, another way to execute the functionality is to materialize the data of the root RDD of the DAG (or any subset of the RDDs) into a table (in this example that would be the 10 original values) and translate the map operation to invoke a table value function on the table by passing in these values and materialize the results (e.g., generate a materialized view). In this example, the partitioning schemes are not preserved and the partitioning boundaries are created based on the same scheme for tables in the subject system. The table valued function would simply execute the lambda of the map function by deserializing the data object first and invoking it.

In an embodiment, complexity is introduced when there are shuffle stages involved, in which these can be used when there is explicit (e.g., repartition, repartitionBy, etc.) or implicit (e.g., group by key, join, etc.) repartitioning is required. In such instances, the iterator may not be invoked on the partitions since the dependent RDDs of the shuffle phase will not have the data. Instead, the shuffle operation can be executed by the subject system by converting the source partitioning to the required destination partitions.

In the following, explicit repartition operations into three partitions and the resulting RDD DAG (e.g., the bottom two RDDs are the result from the previous code example) are included:

```
val rddPart = rddMap1.repartition(3)
val result2 = rddPart.glom( ).collect( )
The DAG now becomes more complex with the introduction of four new RDDs:
(3) MapPartitionsRDD[6] at repartition at Test.scala:167 [ ]
 | CoalescedRDD[5] at repartition at Test.scala:167 [ ]
 | ShuffledRDD[4] at repartition at Test.scala:167 [ ] -> SfRDD
 +-(5) MapPartitionsRDD[3] at repartition at Test.scala:167 [ ]
    | MapPartitionsRDD[1] at map at Test.scala:162 [ ]
    | ParallelCollectionRDD[0] at parallelize at Test.scala:161 [ ]
number of partitions:3
[40,80,100]
[10,50]
[20,30,60,70,90]
```

While not visible in the output, the following details illustrate the operations:

MapPartitionsRDD[3] creates key-value tuples for each record with a random partition destination and the value from the dependent partition records and persists buckets per destination partitions based on hashing ShuffledRDD[4] populates the new partitions by reading the buckets generated by this shuffle stage from the nodes CoalescedRDD[5] would reduce the number of partitions if necessary by grouping local partitions together if applicable MapPartitionsRDD[6] maps the key-value tuples back to the values In view of the above example, the translation of this DAG could execute the RDDs from MapPartitionsRDD[3] just like before, which would result in a result table with a tuple now for the result column where the key is the destination partition number and the value is the record from the partition. Next, a new partition table is generated (SPARK_EXAMPLE_SHUFFLE_0) based on the partition information on the ShuffleRDD[4] RDD and is joined with the result table, which provides the table to operate on. When the RDD DAG is serialized, the ShuffRDD[4] RDD is replaced with a custom RDD which will read the serialized records from the previous result. The MapPartitionsRDD[6] functionality is then invoked with a Scala table function similar to the original approach but now executed as in the following example of an database query with SQL statements:

```
CREATE OR REPLACE TABLE
TS_RESULT_DEFAULT_APP_NAME_1 AS
(
 SELECT
  TS_PARTITION_NUMBER AS PARTITION_NUMBER,
  TS_PARTITION_RECORD AS PARTITION_RECORD
  FROM SPARK_EXAMPLE_SHUFFLE_0 S
  JOIN TS_RESULT_DEFAULT_APP_NAME_0 R
  ON S.PARTITION_NUMBER = R.PARTITION_NUMBER,
  LATERAL
```

-continued

```
TS_RESULT_DEFAULT_APP_NAME_1_FUNCTION
(
 S.PARTITION_NUMBER,
 S.PARTITION_OBJECT,
 S.RDD_OBJECT,
 R.PARTITION_RECORD
)
OVER (PARTITION BY S.PARTITION_NUMBER)
)
```

In this example, a different table valued function is utilized which will deserialize the result of the previous RDD fragment and use it in the iterator to pass it to a custom RDD which will in turn serve it to the dependent RDDs above it (e.g., in the DAG).

Continuing the discussion of the driver 430, the job monitor 434, in an embodiment, manages a queue of jobs (e.g., SQL queries) in an order of receipt and/or an order of priority, and each of those one or more jobs may be communicated to the driver 430 to be scheduled and executed by the compute service manager 108 of the network-based data warehouse system 102. In an embodiment, the job monitor 434 can also receive a notification from the interpreter 432 indicating that a job has been initiated (e.g., based on converting the first code discussed above to an equivalent and compatible SQL query), which in response the job monitor 434 can monitor the progression of the job (e.g., indicate as currently executing). Such a job can be included as part of a query plan (e.g., when the job involves performing an SQL query) for execution by the compute service manager 108 in an embodiment.

In an embodiment, after translating the code in the first programming language to a SQL query, the interpreter 432 sends the SQL query to the compute service manager 108 as a job for processing as discussed further below.

Continuing the above RDD example, the interpreter 432 serializes the second RDD and second (translated) code and sends the serialized RDD and second code to a stage 440 for storage (e.g., as a JAR file). As shown, the stage 440 includes an internal stage 442 for storing the second RDD and the second code, and a cache 444. As referred to herein, a stage specifies where data is stored (i.e. "staged") so that the data can be loaded into a table. In an embodiment, stage 440 performs the following:

Storing persisted/cached RDD objects, to avoid re-computation

Storing serialized closures and client data for a job

Storing user JARs and dependencies

Storing serialized UDFs

For passing data back from one cluster to another cluster

During execution, the serialized data (e.g., JAR file) stored in the internal stage 442 is received by an execution node provided in the execution platform 110. The execution node can execute the serialized data (e.g., including code and data) along with the SQL query.

In an embodiment, the interpreter 432 creates a function (e.g., in the second programming language such as Java) and submits a query (e.g., including at least one SQL statement), which calls the created function, to the compute service manager 108 for execution. Such a function may be a user defined function (UDF) generated, at least in part, by the interpreter 432 based on the code statements in the first programming language (e.g., Scala) as discussed before. As mentioned herein, a UDF includes arbitrary code that in some examples perform computing operations or invoke functions (e.g., code-based) related to a database query.

In an example, the aforementioned submitted SQL query is a job that is sent to the compute service manager 108. As illustrated (and discussed before), the compute service manager 108 includes the job compiler 212, and the job optimizer 214. The job compiler 212 parses the job (e.g., the submitted query that calls the created function) into a set of discrete tasks and generates the execution code for each of the discrete tasks. The job optimizer 214 determines the best method to execute the discrete tasks based on the data that needs to be processed. In an example, the compute service manager 108 sends the execution code for each of the discrete tasks to an execution node from the execution platform 110 for executing the tasks corresponding to the SQL query.

As illustrated, the execution node 302-1 from the execution platform 110 includes a server process 450, which in an embodiment is running on the processor 306-1 and can also utilize memory from the cache 304-1 (or another memory device or storage). The execution node 302-1 can include one or more worker threads such as worker thread 451 and worker thread 452 that perform different operations that are dispatched for execution from the server process 450 (e.g., execute JVM (Java/Scala) code). As mentioned herein, a "process" or "computing process" can refer to an instance of a computer program that is being executed by one or more threads (e.g., worker threads) of a given execution node. As illustrated, each worker thread can read or store data in the data storage device 120-1 provided by the cloud storage platform 104.

As further shown, the execution node 302-1 includes a containerized worker 460 that can be implemented as a virtual machine (e.g., JVM), which provides a sandbox environment for more securely executing operations. In an embodiment, the containerized worker 460 is a sandboxed, privilege-restricted JVM process. The containerized worker 460 may be executed on a separate execution node from execution node 302-1 in an example. The containerized worker 460 can read data and store results of performing the operations, among other types of information or messages, in an external system 480, including an external cloud storage platform 482. Containerized worker 460, in an embodiment, is a sub-process (or separate process) from the server process 450.

In an example, the execution node 302-1 can download serialized data stored in the stage 440. In this example, the containerized worker 460 receives the serialized data (e.g., JAR file including executable data) from the stage 440 and execute the serialized data and code (e.g., associated with the RDD mentioned above as provided from the driver 430). As also discussed above, the code can include a UDF which is utilized by the SQL query that was generated by the driver 430 and is executed by the containerized worker 460. In an embodiment, metadata that was computed, per column of data with respect to partitions, is utilized to determine how to process the serialized data (e.g., each row of incoming data can correspond to a particular partition and be processed accordingly). Results from processing the serialized data and executing the SQL query can be stored in the external cloud storage platform 482 of the external system 480 and/or the data storage device 120-1 provided by the cloud storage platform 104. The client device 114 can receive such results as part of the process of executing the SQL query. Additionally, in an embodiment, the results can also be stored in the cache 444 of the stage 440.

The following discussion relates to enabling support for dataframes in the subject system where translation of a given dataframe to equivalent SQL query can be performed.

In an embodiment, the driver 430 supports the processing and utilization of dataframes. A given dataframe can be generated programmatically or using SQL. In an embodiment, a dataframe can be understood as a lazily-evaluated relational dataset, and effectively represents a query. In another example, a dataframe can also represent a constant query e.g., raw data. Dataframes can be composed. The data represented by the dataframe can be computed or retrieved using a trigger action, such as a collect function. For example, to trigger execution, the subject system invokes a trigger action (e.g., a collect function), which computes the result of executing a dataframe and returns the result to the client device 114. In another example, other ways to create dataframes include being created directly from code. Moreover, a dataframe can be backed by some relational view (i.e., a query) that the network-based data warehouse system 102 knows how to process in a given virtual warehouse.

The result of a given operation by the network-based data warehouse system 102 can be a dataframe. Any query or command can be represented as a dataframe. Examples include:

Any query, where the dataframe represents the results as a relational collection of data.

"Pseudo-queries", like SHOW statements, which are not technically queries, but where the results are easily interpretable as relational collections of data.

Non-queries, such as DDL/DML statements, where the results are not generally considered result sets, but can be modeled as degenerate result sets.

Following this convention, a sql( ) method exposed by a session object can be used to capture an arbitrary SQL command, and construct a dataframe as its results.

As these dataframes are composed, they may represent single queries (which can be lazily evaluated) or multiple commands. Multiple commands can be required in an instance where dataframes support composing SQL statements that may not support direct composition.

For example, a dataframe can be composed that performs aggregation on the result of a SHOW TABLES command. To support this, the subject system runs the command, and then uses a result scan to work over its results. As mentioned herein, a result scan can refer to returning a result set of a previous command (e.g., within a period of time of when the query was executed) as if the result was a table. Even when a Dataframe represents multiple commands, these commands are executed only when an action is performed. In another example, outputs of previous commands, even ones that are non-queries, can be captured in an internal table that can then accessed using a result scan and queried.

In an embodiment, a DDL command will not be executed unless an action such as an execute function is applied.

There are a few ways to trigger evaluation of a dataframe in the subject system, i.e., to actually execute the query backing the dataframe:

Via collect( ). A collected dataframe returns the result of the evaluated queries as an array of type Row back to the client.

Via toLocalIterator( ), an java iterator of rows instead of an array to the client.

Via count( ). A count operation applies a count aggregation to the dataframe and returns the numeric result to the client.

Via persist( ) or cache( ). These methods trigger materialization of the dataframe as a temporary table in the subject system and return a new dataframe that refers to this materialized table.

Via execute( ). This method triggers execution of the dataframe, and returns a status object to the client. Its primary use is for statements that don't return any meaningful result beyond a success or failure status (e.g., setting parameters, DDL, etc.).

Example dataframe operations include:

Basic relational operations (projections, filters, joins, aggregations);

System supported SQL functions; and

Non-relational operations (iteration, etc.)

Figure 5:
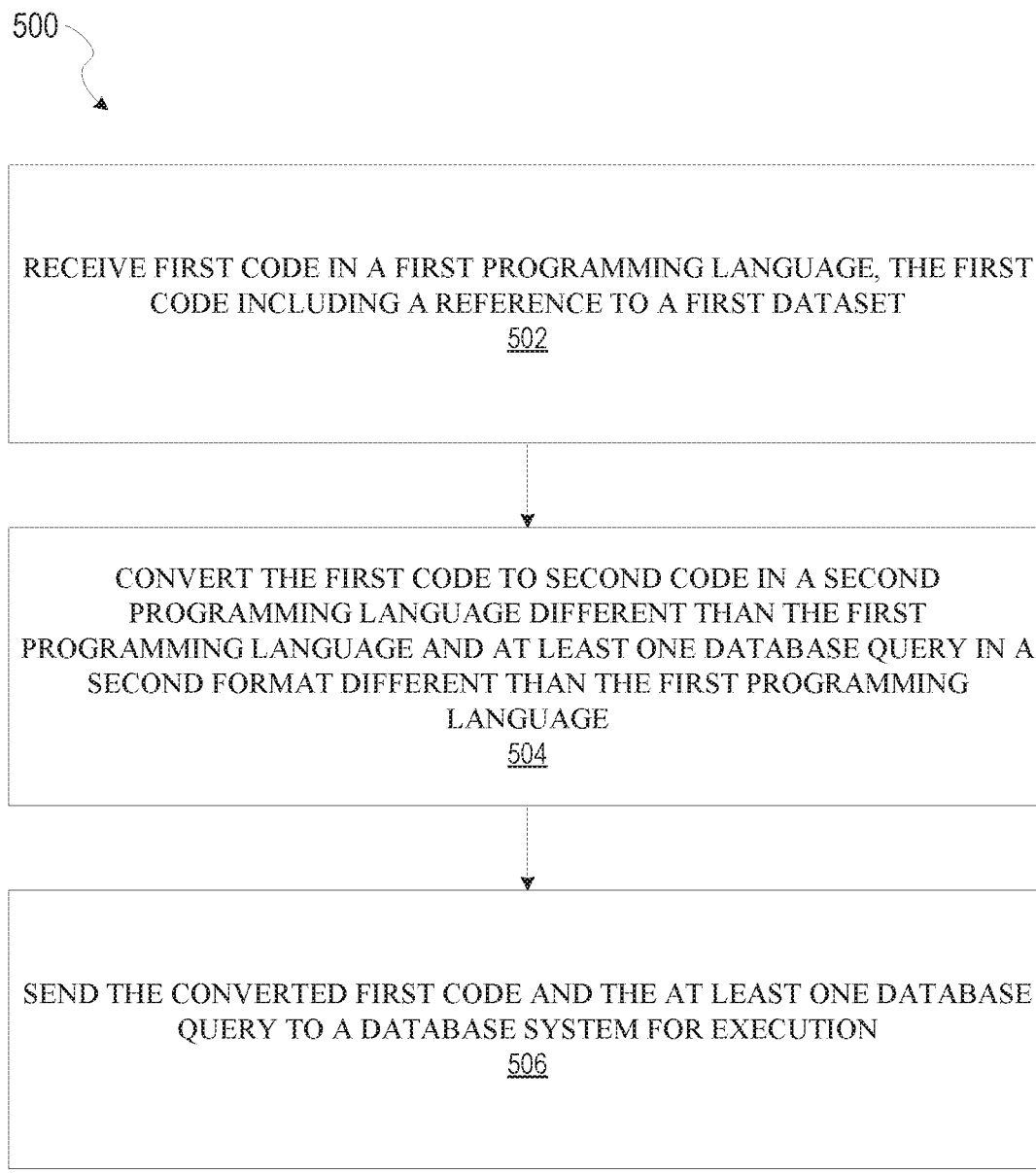
FIG. 5 is flow diagram illustrating operations of a client in performing a method for translating code in a first programming language to code in a second programming language and a database query, in accordance with some embodiments of the present disclosure.

FIG. 5 is flow diagram illustrating operations of a client (e.g., the client device 114) in performing a method for translating code in a first programming language to code in a second programming language and a database query, in accordance with some embodiments of the present disclosure. The method 500 may be embodied in computer-readable instructions for execution by one or more hardware components (e.g., one or more processors) such that the operations of the method 500 may be performed by components of the client device 114. Accordingly, the method 500 is described below, by way of example with reference thereto. However, it shall be appreciated that the method 500 may be deployed on various other hardware configurations and is not intended to be limited to deployment within the client device 114. For example, it is appreciated that the method 500 may be performed in network-based data warehouse system 102, such as components included therein as described above.

At operation 502, the client device 114 receives first code in a first programming language, the first code including a reference to a first dataset. At operation 504, the client device 114 converts the first code to second code in a second programming language different from the first programming language and at least one database query in a second format different from the first programming language. At operation 506, the client device 114 sends the converted first code and the at least one database query to a database system (e.g., network-based data warehouse system 102) for execution.

In an example, the client device 114 can perform the following process for translating code in a first programming language involving a DAG and UDF, in accordance with some embodiments of the present disclosure. The client device 114 generates a directed acyclic graph (DAG) of RDD. The client device 114 generates a user defined function (UDF) based at least in part on the first code. At operation 606, the client device 114 serializes DAG and UDF. The client device 114 sends the serialized DAG and UDF to the network-based data warehouse system 102 for storage. The client device 114 generates a database query based on first code. The client device 114 sends the database query to the network-based data warehouse system 102 for execution.

Although the above example discusses an RDD, and it is understood that the subject system could produce and operate over a DAG of RDDs, the subject system is also configured to also produce and operate over a DAG of dataframes without ever building the DAG of RDDs as discussed in further detail in the following description.

Figure 6:
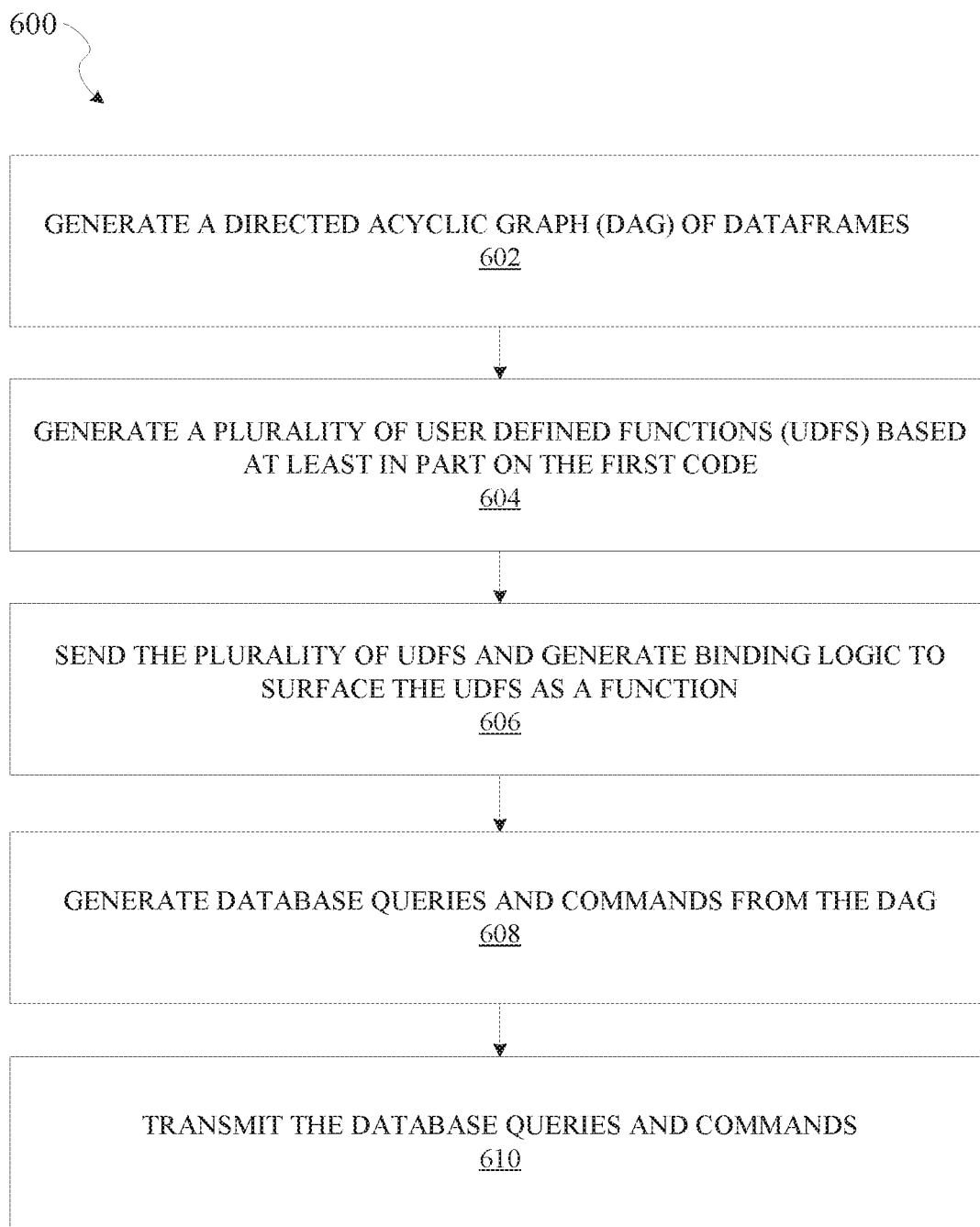
FIG. 6 is flow diagram illustrating operations of a client in performing a method for translating code in a first programming language involving dataframes, in accordance with some embodiments of the present disclosure, in accordance with some embodiments of the present disclosure.

FIG. 6 is flow diagram illustrating operations of a client (e.g., the client device 114) in performing a method for translating code in a first programming language involving dataframes, in accordance with some embodiments of the present disclosure. The method 600 may be embodied in computer-readable instructions for execution by one or more hardware components (e.g., one or more processors) such that the operations of the method 600 may be performed by components of the client device 114. Accordingly, the method 600 is described below, by way of example with reference thereto. However, it shall be appreciated that the method 600 may be deployed on various other hardware configurations and is not intended to be limited to deployment within the client device 114. For example, it is appreciated that the method 600 may be performed in network-based data warehouse system 102, such as components included therein as described above.

At operation 602, the client device 114 generates a DAG of dataframes. In an example, the DAG can be serialized for sending (e.g., as discussed below). At operation 604, the client device 114 generates a plurality of UDFs (e.g., UDF code) based at least in part on the first code. At operation 606, the client device 114 sends the plurality of UDFs (e.g., UDF code) to the network-based data warehouse system 102 and generates binding logic to surface the UDFs (e.g., UDF code) as a function. At operation 608, the client device 114 generates database queries and commands from the DAG, where these can refer to the UDFs. At operation 610, the client device 114 transmits the generated database queries and commands to the network-based data warehouse system 102 for execution.

Figure 7:
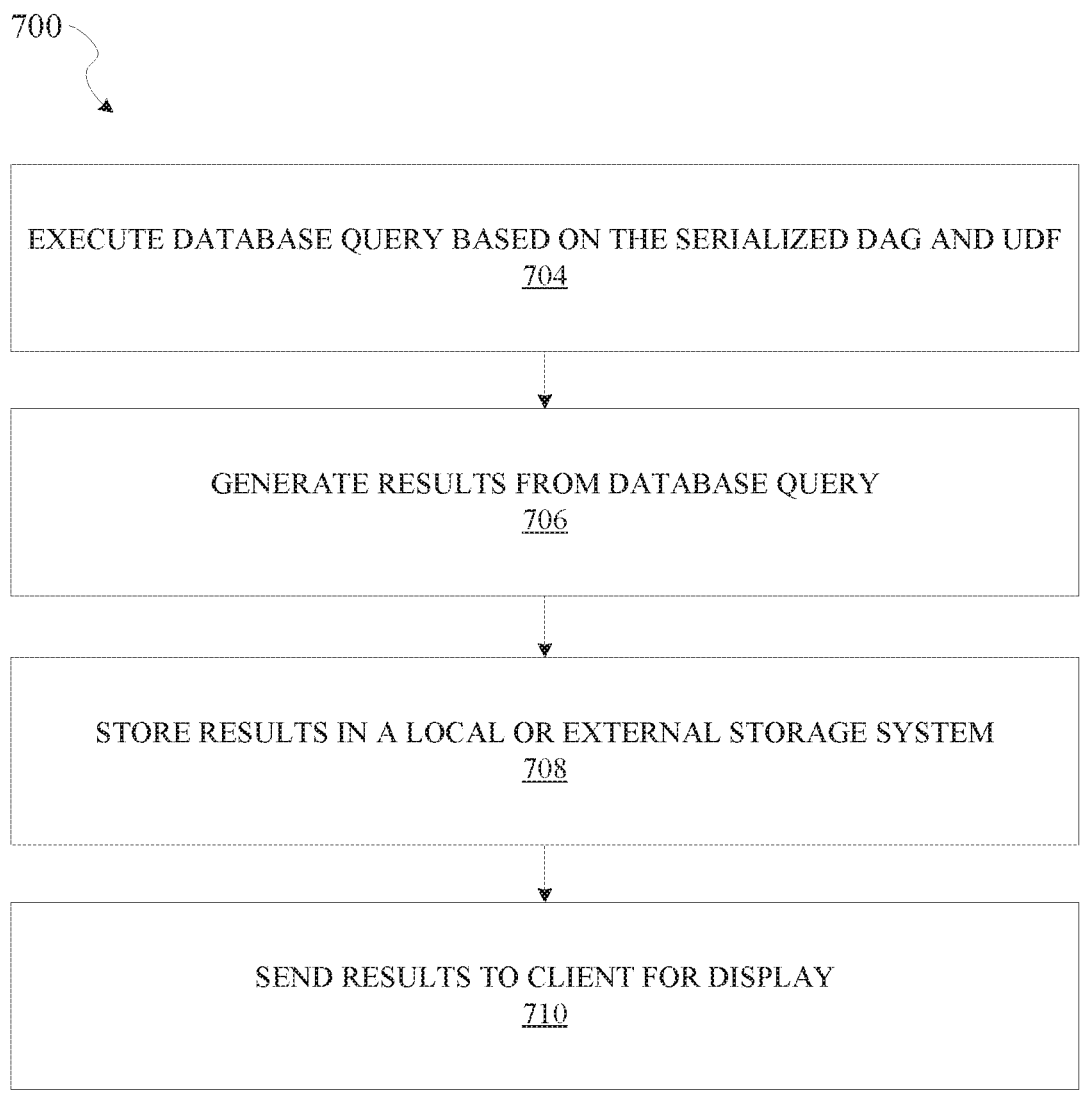
FIG. 7 is flow diagram illustrating operations of a database system in performing a method for executing a database query that utilizes a user defined function (UDF) generated by the aforementioned code translation techniques, in accordance with some embodiments of the present disclosure.

FIG. 7 is flow diagram illustrating operations of a database system in performing a method for executing a database query that utilizes a user defined function (UDF) generated by the aforementioned code translation techniques, in accordance with some embodiments of the present disclosure. The method 700 may be embodied in computer-readable instructions for execution by one or more hardware components (e.g., one or more processors) such that the operations of the method 700 may be performed by components of network-based data warehouse system 102, such as components of the execution platform 110. Accordingly, the method 700 is described below, by way of example with reference thereto. However, it shall be appreciated that the method 700 may be deployed on various other hardware configurations and is not intended to be limited to deployment within the network-based data warehouse system 102.

At operation 704, the execution node executes a database query based on the serialized DAG and UDF. At operation 706, the execution node generates results from database query. At operation 708, the execution node store results in a local or external storage system. At operation 710, the execution node sends results to the client (e.g., the client device 114) for display or other processing.

Figure 8:
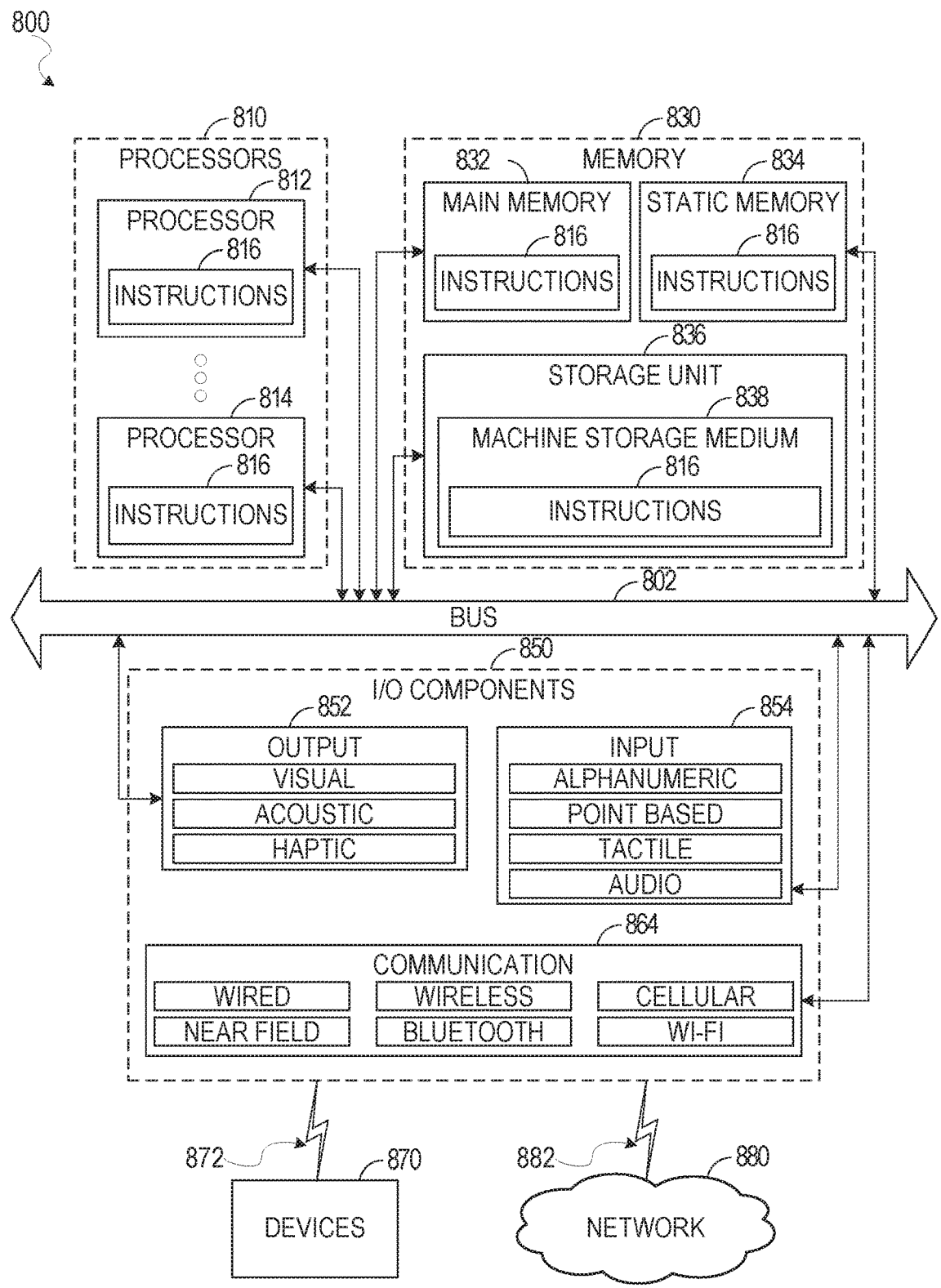
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the method 500. As another example, the instructions 816 may cause the machine 800 to implement portions of the data flows illustrated in FIG. 4. In this way, the instructions 816 transform a general, non-programmed machine into a particular machine 800 (e.g., the compute service manager 108 or a node in the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 870 may include the client device 114 or any other computing device described herein as being in communication with the network-based data warehouse system 102 or the cloud storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

EXAMPLES OF EMBODIMENTS

Following is a list of some examples of embodiments described herein.

Example 1 is system comprising: at least one hardware processor; and a memory storing instructions that cause the at least one hardware processor to perform operations comprising: receiving first code in a first programming language, the first code including a reference to a first dataset; converting the first code to: second code in a second programming language different than the first programming language, and at least one database query in a second format different than the first programming language; and sending the converted first code and the at least one database query to a database system for execution.

In Example 2, the subject matter of Example 1 wherein optionally the first dataset comprises a resilient distributed dataset (RDD), the RDD comprises information defining a set of partitions and including a set of data to be partitioned into the set of partitions, and the RDD is in a first format that is incompatible with the database system.

In Example 3, the subject matter of any one of Examples 1 and 2 wherein optionally the first code is incompatible with the database system and converting the first code to second code in the second programming language comprise further operations optionally comprising: generating a user defined function (UDF) based at least in part on the first code, the UDF including a set of code statements that are in the second programming language compatible with the database system.

In Example 4, the subject matter of any one of Examples 1-3 wherein optionally the database query calls the generated UDF.

In Example 5, the subject matter of any one of Examples 1-4 optionally further comprising: generating a directed acyclic graph (DAG) of the RDD; serializing the DAG; and generating a database table based on the serialized DAG.

In Example 6, the subject matter of any one of Examples 1-5 wherein optionally the database table comprises: a first column corresponding to partition identifier, a second column corresponding to a serialized partition object, and a third column corresponding to a serialized resilient distributed dataset (RDD) directed acyclic graph (DAG) object.

In Example 7, the subject matter of any one of Examples 1-6 optionally further comprising: determining that the first code includes an action command that triggers an output of results, wherein converting the first code to second code is in response to the determining that the first code includes the action command.

In Example 8, the subject matter of any one of Examples 1-7 wherein optimally the second format comprises a database query statement in SQL.

In Example 9, the subject matter of any one of Examples 1-8 optionally further comprising: executing the second code, corresponding to the second format, to partition the first dataset; and storing, in a set of partitions, data from the first dataset in a storage platform.

In Example 10, the subject matter of any one of Examples 1-9 wherein optionally the first code in the first programming language corresponds to an external system different than the database system including a storage platform, the first code being incompatible with the database system.

Example 11 is a method comprising: receiving first code in a first programming language, the first code including a reference to a first dataset; converting the first code to: second code in a second programming language different than the first programming language, and at least one database query in a second format different than the first programming language; and sending the converted first code and the at least one database query to a database system for execution.

In Example 12, the subject matter of Example 11 wherein optionally the first dataset comprises a resilient distributed dataset (RDD), the RDD comprises information defining a set of partitions and including a set of data to be partitioned into the set of partitions, and the RDD is in a first format that is incompatible with the database system.

In Example 13, the subject matter of any one of Examples 11 and 12 wherein optionally the first code is incompatible with the database system and converting the first code to second code in the second programming language comprise further operations optionally comprising: generating a user defined function (UDF) based at least in part on the first code, the UDF including a set of code statements that are in the second programming language compatible with the database system.

In Example 14, the subject matter of any one of Examples 11-13 wherein optionally the database query calls the generated UDF.

In Example 15, the subject matter of any one of Examples 11-14 optionally further comprising: generating a directed acyclic graph (DAG) of the RDD; serializing the DAG; and generating a database table based on the serialized DAG.

In Example 16, the subject matter of any one of Examples 11-15 wherein optionally the database table comprises: a first column corresponding to partition identifier, a second column corresponding to a serialized partition object, and a third column corresponding to a serialized resilient distributed dataset (RDD) directed acyclic graph (DAG) object.

In Example 17, the subject matter of any one of Examples 11-16 optionally further comprising: determining that the first code includes an action command that triggers an output of results, wherein converting the first code to second code is in response to the determining that the first code includes the action command.

In Example 18, the subject matter of any one of Examples 11-17 wherein optimally the second format comprises a database query statement in SQL.

In Example 19, the subject matter of any one of Examples 11-18 optionally further comprising: executing the second code, corresponding to the second format, to partition the first dataset; and storing, in a set of partitions, data from the first dataset in a storage platform.

In Example 20, the subject matter of any one of Examples 11-19 wherein optionally the first code in the first programming language corresponds to an external system different than the database system including a storage platform, the first code being incompatible with the database system.

In Example 21 is a computer-storage medium comprising instructions that, when executed by one or more processors of a machine, configure the machine to perform operations comprising receiving first code in a first programming language, the first code including a reference to a first dataset: converting the first code to: second code in a second programming language different than the first programming language, and at least one database query in a second format different than the first programming language; and sending the converted first code and the at least one database query to a database system for execution.

In Example 22, the subject matter of Example 21 wherein optionally the first dataset comprises a resilient distributed dataset (RDD), the RDD comprises information defining a set of partitions and including a set of data to be partitioned into the set of partitions, and the RDD is in a first format that is incompatible with the database system.

In Example 23, the subject matter of any one of Examples 21 and 22 wherein optionally the first code is incompatible with the database system and converting the first code to second code in the second programming language comprise further operations optionally comprising: generating a user defined function (UDF) based at least in part on the first code, the UDF including a set of code statements that are in the second programming language compatible with the database system.

In Example 24, the subject matter of any one of Examples 21-23 wherein optionally the database query calls the generated UDF.

In Example 25, the subject matter of any one of Examples 21-24 optionally further comprising: generating a directed acyclic graph (DAG) of the RDD; serializing the DAG; and generating a database table based on the serialized DAG.

In Example 26, the subject matter of any one of Examples 21-25 wherein optionally the database table comprises: a first column corresponding to partition identifier, a second column corresponding to a serialized partition object, and a third column corresponding to a serialized resilient distributed dataset (RDD) directed acyclic graph (DAG) object.

In Example 27, the subject matter of any one of Examples 21-26 optionally further comprising: determining that the first code includes an action command that triggers an output of results, wherein converting the first code to second code is in response to the determining that the first code includes the action command.

In Example 28, the subject matter of any one of Examples 21-27 wherein optimally the second format comprises a database query statement in SQL.

In Example 29, the subject matter of any one of Examples 21-28 optionally further comprising: executing the second code, corresponding to the second format, to partition the first dataset; and storing, in a set of partitions, data from the first dataset in a storage platform.

In Example 30, the subject matter of any one of Examples 21-29 wherein optionally the first code in the first programming language corresponds to an external system different than the database system including a storage platform, the first code being incompatible with the database system.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
least one hardware processor; and
a memory storing instructions that cause the at least one hardware processor to perform operations comprising:
receiving first code in a first programming language, the first code including a reference to a first dataset, the first dataset corresponding to a resilient distributed dataset (RDD) to be generated;
generating, by executing the received first code in the first programming language, the RDD, the RDD comprising information defining a set of partitions and including a set of data partitioned into the set of partitions, the RDD being in a first format that is incompatible with a database system;
generating, by executing the received first code in the first programming language, a second RDD based on the generated RDD, the first code further including:
a first particular code statement invoking a first set of operations to generate the RDD, the RDD comprising a first Java virtual machine (JVM) object,
a second particular code statement invoking a second set of operations to map data associated with the RDD and generates the second RDD, the second RDD including a reference to the RDD generated by the first particular code statement, the second RDD comprising a second JVM object, and
a third particular code statement initiating execution of a particular operation to run the second RDD, provided by the second particular code statement, and the particular operation providing a set of results to a driver;
generating, by executing the received first code in the first programming language, a directed acyclic graph (DAG) including the generated RDD and the generated second RDD;
serializing the DAG;
generating a database table based on the serialized DAG, the database table comprising a column corresponding to an object including the serialized DAG, a first column corresponding to partition identifier, and a second column corresponding to a serialized partition object;
determining that the first code includes an action command that triggers an output of results or storing the results;
in response to determining that the first code includes the action command, converting the first code to:
second code in a second programming language different than the first programming language, and at least one database query in a second format different than the first programming language; and
sending the converted first code and the at least one database query to the database system for execution, the converted first code being compatible with the database system.

2. The system of claim 1,
wherein the first code is incompatible with the database system and converting the first code to second code in the second programming language comprise further operations comprising:
generating a user defined function (UDF) based at least in part on the first code, the UDF including a set of code statements that are in the second programming language compatible with the database system.

3. The system of claim 2, wherein the database query calls the generated UDF, the first particular code statement comprises a first code statement in a Scala programming language,
the second particular code statement comprises a second code statement in the Scala programming language,
the third particular code statement comprises a third code statement in the Scala programming language, and
the converted first code includes Java code and a set of SQL statements converted from the Scala programming language.

4. The system of claim 1, wherein the RDD represents a transformation operation, the transformation operation applies a function on the RDD and creates a new RDD, and operations further comprise:
generating a tree of RDD operations based on the RDD; and
evaluating the tree of RDD operations based on the action command.

5. The system of claim 1, wherein the second format comprises a database query statement in SQL.

6. The system of claim 1, wherein the operations further comprise:
executing the second code, corresponding to the second format, to partition the first dataset; and
storing, in a set of partitions, data from the first dataset in a storage platform.

7. The system of claim 1, wherein the first code in the first programming language corresponds to an external system different than the database system including a storage platform, the first code being incompatible with the database system.

8. A method comprising:
receiving first code in a first programming language, the first code including a reference to a first dataset, the first dataset corresponding to a resilient distributed dataset (RDD) to be generated;
generating, by executing the received first code in the first programming language, the RDD, the RDD comprising information defining a set of partitions and including a set of data partitioned into the set of partitions, the RDD being in a first format that is incompatible with a database system;
generating, by executing the received first code in the first programming language, a second RDD based on the generated RDD, the first code further including:
a first particular code statement invoking a first set of operations to generate the RDD, the RDD comprising a first Java virtual machine (JVM) object,
a second particular code statement invoking a second set of operations to map data associated with the RDD and generates the second RDD, the second RDD including a reference to the RDD generated by the first particular code statement, the second RDD comprising a second JVM object, and
a third particular code statement initiating execution of a particular operation to run the second RDD, provided by the second particular code statement, and the particular operation providing a set of results to a driver;
generating, by executing the received first code in the first programming language, a directed acyclic graph (DAG) including the generated RDD and the generated second RDD;
serializing the DAG;
generating a database table based on the serialized DAG, the database table comprising a column corresponding to an object including the serialized DAG, a first column corresponding to partition identifier, and a second column corresponding to a serialized partition object;
determining that the first code includes an action command that triggers an output of results or storing the results, wherein converting the first code to second code is in response to the determining that the first code includes the action command;
in response to determining that the first code includes the action command, converting the first code to:
second code in a second programming language different than the first programming language, and at least one database query in a second format different than the first programming language; and
sending the converted first code and the at least one database query to a database system for execution, the converted first code being compatible with the database system.

9. The method of claim 8, wherein the first code is incompatible with the database system and converting the first code to second code in the second programming language comprise further operations comprising:
generating a user defined function (UDF) based at least in part on the first code, the UDF including a set of code statements that are in the second programming language compatible with the database system.

10. The method of claim 9, wherein the database query calls the generated UDF.

11. The method of claim 8, wherein the RDD represents a transformation operation, the transformation operation applies a function on the RDD and creates a new RDD, and further comprising:
generating a tree of RDD operations based on the RDD; and
evaluating the tree of RDD operations based on the action command.

12. The method of claim 8, wherein the second format comprises a database query statement in SQL.

13. The method of claim 8, further comprising:
executing the second code, corresponding to the second format, to partition the first dataset; and
storing, in a set of partitions, data from the first dataset in a storage platform.

14. The method of claim 8, wherein the first code in the first programming language corresponds to an external system different than the database system including a storage platform, the first code being incompatible with the database system.

15. A non-transitory computer-storage medium comprising instructions that, when executed by one or more processors of a machine, configure the machine to perform operations comprising:
receiving first code in a first programming language, the first code including a reference to a first dataset, the first dataset corresponding to a resilient distributed dataset (RDD) to be generated;
generating, by executing the received first code in the first programming language, the RDD, the RDD comprising information defining a set of partitions and including a set of data partitioned into the set of partitions, the RDD being in a first format that is incompatible with a database system;
generating, by executing the received first code in the first programming language, a second RDD based on the generated RDD, the first code further including:
a first particular code statement invoking a first set of operations to generate the RDD, the RDD comprising a first Java virtual machine (JVM) object,
a second particular code statement invoking a second set of operations to map data associated with the RDD and generates the second RDD, the second RDD including a reference to the RDD generated by the first particular code statement, the second RDD comprising a second JVM object, and
a third particular code statement initiating execution of a particular operation to run the second RDD, provided by the second particular code statement, and the particular operation providing a set of results to a driver;
generating, by executing the received first code in the first programming language, a directed acyclic graph (DAG) including the generated RDD and the generated second RDD;
serializing the DAG;
generating a database table based on the serialized DAG, the database table comprising a column corresponding to an object including the serialized DAG, a first column corresponding to partition identifier, and a second column corresponding to a serialized partition object;
determining that the first code includes an action command that triggers an output of results or storing the results;
in response to determining that the first code includes the action command, converting the first code to:

second code in a second programming language different than the first programming language, and at least one database query in a second format different than the first programming language; and sending the converted first code and the at least one database query to a database system for execution, the converted first code being compatible with the database system.

16. The non-transitory computer-storage medium of claim 15, wherein the first code is incompatible with the database system and converting the first code to second code in the second programming language comprise further operations comprising:

generating a user defined function (UDF) based at least in part on the first code, the UDF including a set of code statements that are in the second programming language compatible with the database system.

17. The non-transitory computer-storage medium of claim 16, wherein the database query calls the generated UDF.

18. The non-transitory computer-storage medium of claim 15, wherein the RDD represents a transformation operation, the transformation operation applies a function on the RDD and creates a new RDD, and operations further comprise:

generating a tree of RDD operations based on the RDD; and evaluating the tree of RDD operations based on the action command.

19. The non-transitory computer-storage medium of claim 15, wherein the second format comprises a database query statement in SQL.

20. The non-transitory computer-storage medium of claim 15, wherein the operations further comprise:

executing the second code, corresponding to the second format, to partition the first dataset; and storing, in a set of partitions, data from the first dataset in a storage platform.

21. The non-transitory computer-storage medium of claim 15, wherein the first code in the first programming language corresponds to an external system different than the database system including a storage platform, the first code being incompatible with the database system.

* * * * *

UNITED STATES PATENT AND TRADEMARK OFFICE
CERTIFICATE OF CORRECTION

| | |
|---|---|
| PATENT NO. | : 11,474,799 B2 |
| APPLICATION NO. | : 16/945561 |
| DATED | : October 18, 2022 |
| INVENTOR(S) | : Cseri et al. |

It is certified that error appears in the above-identified patent and that said Letters Patent is hereby corrected as shown below:

In the Claims

In Column 27, Line 43, in Claim 1, before "least", insert --at--

Signed and Sealed this
Twenty-ninth Day of August, 2023

Katherine Kelly Vidal
*Director of the United States Patent and Trademark Office*